Aug. 7, 1934.   J. D. LEAR   1,969,224
TIRE VALVE
Filed Dec. 29, 1930
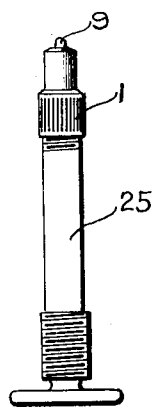
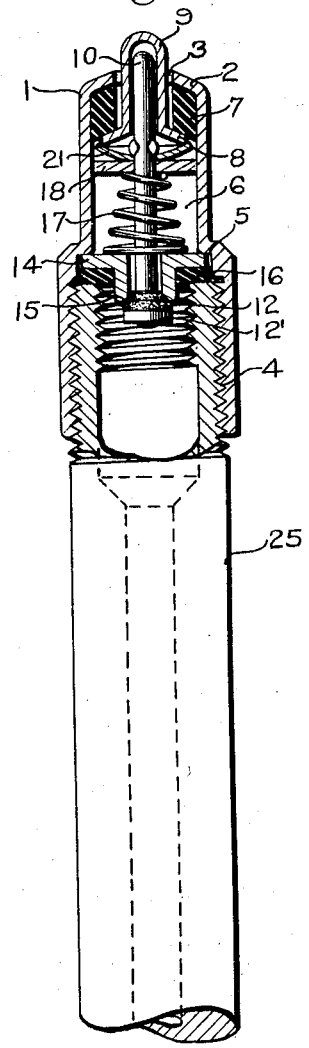
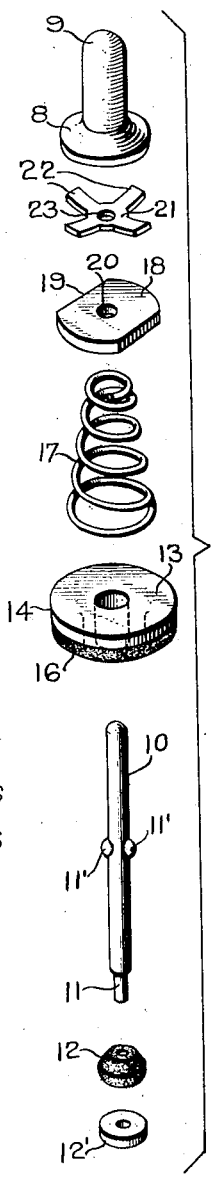
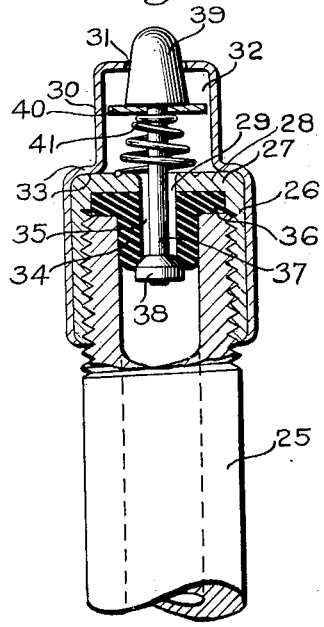
Inventor
Joseph D. Lear
By Barton A. Bean Jr.
Attorney Patented Aug. 7, 1934

1,969,224

UNITED STATES PATENT OFFICE 1,969,224

TIRE VALVE

Joseph D. Lear, Buffalo, N. Y., assignor to Sterling Automotive Products Corporation, Buffalo, N. Y.

Application December 29, 1930, Serial No. 505,440

6 Claims. (Cl. 152—12)

This invention relates to valve mechanisms for pneumatic tires, and especially to those located in the dust cap at the extremity of a valve stem.

In prior structures, attention has chiefly been directed to the perfection of the valve devices located and secured entirely within the valve stem. Dust cap structures of various types have also been provided, some of which having an additional dust valve to protect the inner valve located in the valve stem, and at times to control the operation of the same. It is the prime object of this invention to entirely eliminate the necessity of locating the air valve within the valve stem. This is accomplished by locating the same within the dust cap, which may be applied or removed therewith. The dust cap, when screwed on the valve stem, completes a valve assembly in a novel manner and includes an air valve and a valve through which air is supplied to the tire without the necessity of removal of the dust cap, as in the present widely used valve structures.

It is a further object of the invention to provide a separate means for seating the dust valve and air valve, and to control the operation of the air valve in its opened position by the actuation of the dust valve. In addition to this, portions of the air valve structure in turn cooperate to guide the dust valve during movement thereof.

Other features of the cooperative valve structures are chiefly aimed at simplicity of design, with the object of obtaining economical mass production.

These and other features and objects of the invention are more specifically set forth in the accompanying drawing and specification.

In the drawing:—

Fig. 1 is a side elevation of the dust cap applied to a valve stem of a pneumatic tire.

Fig. 2 is an enlarged view of Fig. 1 in partial cross section.

Fig. 3 is a perspective view showing the valves and associated parts in disassembled relation and arranged in their assembling order.

Fig. 4 is a cross-sectional view, similar to Fig. 2, of a further embodiment of the invention.

The numeral 1 indicates a housing or dust cap body which is of tubular form and partially closed at its top extremity to form an angular wall 2 having a central opening 3. The interior of the opposite extremity of the body is threaded at 4 and the threaded portion terminates in a seat mounting portion or annular shoulder 5. Immediately above the threaded portion the body is reduced in diameter to form a spring chamber 6. A dust valve 7, preferably of rubber, is inserted within the spring chamber, abuts the angular wall 2 and is provided with an opening registering with the opening 3. A dust valve provided with an annular seat portion 8 extending angularly from a hollow stem portion 9 is mounted within the spring chamber 6 with the hollow stem portion 9 extending through the seat 7 and the opening 2 of the body.

A spring and valve assembly is mounted within the body as a separate unit and consists of a valve stem or rod 10 having a reduced rivet portion 11 at one extremity, and an ear portion 11' struck out of the rod near its central portion. An air valve 12, preferably of hard rubber or the like, is mounted on the reduced portion 10 and secured thereto by a suitable washer 12' through which the reduced portion extends and is riveted with the washer. A number of cooperating members are now assembled about the rod and air valve assembly in the following order;—a valve seat member 13 having a cylindrical hub provided with an annular flange 14 and an angular valve seat 15; an annular gasket 16 mounted about the hub portion and abutting the annular flange 14; an air valve spring 17 mounted about the rod; a circular guide washer 18 having flat air entry portions 19 and a central opening 20 engaging about the rod; and a dust valve spring 21 having leaf spring portions 22 and a central opening 23 engaging about the rod. The assembly is completed by first compressing the spring 17 and then striking the ear portions 11' out of the rod 11. The ear portions engage the spring 22 and retain the spring 17 under compression between the guide washer 18 and the seat member 13, thereby resiliently retaining the air valve 12 on its seat 15.

The assembly above described is adapted to be inserted within the body 2 with the marginal portions of the annular flange 14 seated against the shoulder 5 therein, and with the gasket 16 lightly engaging the walls adjacent the extremity of the threaded portion to retain the entire assembly frictionally therein. Upon this insertion, the top extremity of the rod will enter into the hollow portion of the dust valve 7 and will be spaced from the top extremity thereof and the flat dust valve spring 21 will resiliently engage the lower extremities of the angular seat portion of the dust valve and urge the same upwardly to seat against the dust valve seat 7.

Upon screwing the dust cap upon the valve stem of a tire, indicated at 25, the top extremity of the latter member will engage the gasket 16 in an air-tight connection. This is the only operation necessary for assembling the dust cap with a pneumatic tire valve stem. In operation, when an air gun is applied to the protruding portion of the dust valve stem 9, it will be thrust downwardly until the top extremity of the rod 10 engages therewith, upon which both the rod and dust valve will be conveyed downwardly to open or unseat the air valve 12 from its seat 15, thus establishing communication between the air gun and the interior of the pneumatic tire for inflating purposes. It will be noted that during the downward movement of the rod 10, the rod will be guided against angular displacement by the guide washer 18 which slidably contacts with the wall of the spring chamber 6. The top end of the rod is also guided by contact with the inner walls of the dust valve. When the air gun is removed, a reversal of the above described action takes place, and the spring 17 moves the rod upwardly and seats the air valve 12 on its seat 15.

Simultaneously with this action, the spring 17 urges the relatively lighter dust valve spring 21 into engagement with the dust valve to properly seat the same. The spring 21, being relatively weaker than spring 17 is compressed thereby without substantially effecting or retarding the loading of the valve 12 by the heavier spring.

The dust valve is chiefly intended for use to prevent dust, water, or other undesirable substances from entering into the spring chamber, but through the construction above described, the dust valve, upon failure of the air valve 12, will act as an auxiliary air valve, as it is properly constructed to provide an air-tight seal.

In Fig. 4 a further and simpler embodiment of the invention is shown. In this device, an interior housing 26 is provided and comprises a cylindrical portion 27 threaded at its inner diameter and having a top wall 28 drilled through to form an inlet 29. A casing 30 is pressed over the auxiliary housing and comprises a tube closed at its upper end and having a dust valve opening 31 therein. The upper portion of the casing is reduced in diameter to form a spring chamber 32 which terminates in the shoulder portion 33. Prior to pressing the lower portion of the casing on the housing 26, a valve structure is assembled with the latter part.

The valve structure comprises a seating member 34 which is preferably of rubber and cylindrical in form, and provided with a central port 35. At the top extremity of this member, an annular flange 36 is provided which abuts the top wall 28 of the housing. A rod 37 is provided with an enlarged end portion indicated at 38 forming an air valve which is adapted to seat at the extremity of the seat member 34. The rod extends upwardly through the air inlet port 29 and its top extremity is secured in any suitable manner to a dust valve 39. The dust valve is conical in shape and closed at its upper end, such end protruding through the opening 31 of the casing. Immediately beneath the dust valve a guide washer 40 is mounted about the rod 37, and extending between said washer and the annular flange 36 of the seat member, an air valve spring 41 is compressed and mounted.

When the casing 30 is pressed onto the housing 26, the latter member is enclosed therein with its annular flange 36 abutting the shoulder 33 of the casing. This completes the assembly and the valve spring 41 and accompanying washer are completely housed within a spring chamber 32 of the casing with the washer in sliding contact with the inner walls thereof. In this embodiment the dust valve has slight clearance with the opening 31 to permit the unimpeded seating of the air valve 38 on its seat member 34. When this assembly is screwed down on a tire valve stem, the upper face of such stem engages the annular flange 36 of the seat member which acts as a gasket in the assembly to provide an air-tight joint.

What is claimed is:—

1. In a cap for a tire valve stem, a housing having a valve seat at one extremity and formed for detachable connection with a valve stem at the opposite extremity; a dust valve on said valve seat having a portion extending through said valve seats; a valve and seat assembly removably mounted in the housing comprising, a seat member having an annular portion and an axial seat, an air valve on said seat, a rod secured to the air valve and extending through the seat member, a spring mounted about the extending portion of the rod and abutting the said member, a guide washer on the rod engaging said spring, a leaf spring on the rod abutting the washer, and means on the rod engaging the leaf spring against disassembly therewith; said assembly being inserted in the housing as a unit, the annular portion of the seat portion being rigidly clamped upon assembly of the housing with the valve stem, said guide washer slidably engaging within the housing to guide said rod for axial movement and said leaf spring engaging said dust valve to resiliently retain the same on its seat, said dust valve being depressible to unseated position on its valve and contacting with and moving said rod to unseat said air valve.

2. In a cap for a tire valve stem, a housing formed for detachable connection with a valve stem at one extremity and having an opening formed in its free extremity, a fixed valve seat within the housing adjacent said free extremity, a shoulder in the housing spaced from said seat; a valve and seat assembly unit removably mounted in the housing comprising a seat member having an annular portion and a seat portion co-axial therewith and extending therefrom, a gasket frictionally engaging about the seat member, a valve on the seat portion, a rod secured to the valve and extending through the seat member, resilient means about the rod for retaining the valve on the seat portion, a second valve adapted to engage the seat in the housing and formed with a recessed portion slidably receiving the extremity of the rod, a second resilient means about the rod for engaging the second valve to retain the same on its seat, said unit being bodily inserted in the housing whereupon the annular portion of the seat member is adapted to be rigidly clamped to the shoulder of the housing upon assembly of the housing to the valve stem, said second valve upon said assembly having a portion protruding through the opening in the free extremity of the housing.

3. In a cap for a tire valve stem, a housing formed with a cylindrical chamber open at opposite ends and formed at one end with means for securing to a stem and having a fixed internal seat at its opposite end, a valve on said seat having a portion extending through the housing, a second valve seat carried by the housing in spaced and coaxial relation to the first seat, a valve on said second seat having an axially projecting portion extending in spaced proximity to the first valve, axial wall means on the first valve slidably receiving the end of said projecting portion, guide means on one of said valve slidably engaging the wall of said chamber and mounting said valve in substantial concentricity therewith, whereby said extending portion of the first valve is adapted to be depressed to unseat the same and is further depressible to engage the first valve with said projecting portion to unseat the second valve, and resilient means for returning each valve to its respective seat, said guide means and said projecting and axial wall portions cooperating to retain said valves in concentricity with their seats during return movement.

4. In a cap for a tire valve stem, a housing open at opposite ends and formed at one end with means for securing to a stem and having a fixed internal seat at the opposite end, a valve on said seat having a portion extending through the housing, a second valve seat mounted within the housing in spaced and coaxial relation to the first seat, a valve on said second seat having an axially projecting portion extending in spaced proximity to the first valve, axial wall means on the first valve slidably receiving the end of said projecting portion, whereby said extending portion of the first valve is adapted to be partially depressed to unseat the same and is further depressible to engage the first valve with said projecting portion to unseat said second valve, and resilient means for urging each valve to its respective seat.

5. In a cap for a tire valve stem, a housing having a fixed internal valve seat at one extremity and formed for detachable connection with a valve stem at the opposite extremity, a valve on said valve seat having a portion extending therethrough, a second valve seat carried by the housing and spaced from said first valve seat, a valve on the second seat, and resilient means for retaining the valves on their seats, one of said valves having a stem extending toward the remaining valve and spaced therefrom and the remaining valve being formed with a recessed portion for slidably receiving said stem, whereby the extending portion of said first valve is depressible to unseat said first valve, and is further depressible to cause the unseating of the second valve.

6. A cap member adapted to be secured to a tire stem, comprising a housing formed with a cylindrical chamber open at opposite ends and provided at one end with means for securing to a stem, a pair of spaced valve seats within the housing, a valve on each seat, one of said valves being mounted for guided axial movement in the housing chamber, rod means connected to the second valve and extending to the first valve in spaced relation thereto, means on the first valve for slidably receiving the adjacent end of said rod means, whereby said end of the rod means is retained against axial misalignment by the first valve, and resilient means for each valve for urging each valve to its respective seat.

JOSEPH D. LEAR.